United States Patent [19]

Meidl

[11] Patent Number: 4,857,198
[45] Date of Patent: Aug. 15, 1989

[54] PROCESS FOR TREATMENT OF WATER CONTAINING VOLATILE AND TOXIC COMPOUNDS

[75] Inventor: John A. Meidl, Weston, Wis.

[73] Assignee: Zimpro/Passavant Inc., Rothschild, Wis.

[21] Appl. No.: 226,028

[22] Filed: Jul. 29, 1988

[51] Int. Cl.$^4$ .............................................. C02F 3/08
[52] U.S. Cl. ................................. 210/603; 210/607; 210/618; 210/624; 210/625; 210/631; 210/673; 210/761; 210/908; 55/76; 203/10
[58] Field of Search .............. 210/603, 607, 616–618, 210/621, 623–626, 631, 670, 673, 694, 750, 761, 765, 908, 909; 55/53, 68, 74, 76, 84; 203/10, 41, 42

[56] References Cited

U.S. PATENT DOCUMENTS

| | | | |
|---|---|---|---|
| 3,803,029 | 4/1974 | Blecharczyk | 210/618 |
| 3,828,525 | 8/1974 | Copa et al. | 55/68 |
| 3,904,518 | 9/1975 | Hutton et al. | 210/616 |
| 3,977,966 | 8/1976 | Pradt et al. | 210/631 X |
| 4,005,011 | 1/1977 | Sweeny | 210/631 |
| 4,069,148 | 1/1978 | Hutton et al. | 210/616 |
| 4,080,287 | 3/1978 | Conway et al. | 210/694 X |
| 4,623,464 | 11/1986 | Ying et al. | 210/626 X |
| 4,626,354 | 12/1986 | Hoffman et al. | 210/603 |
| 4,749,492 | 6/1988 | Berrigon, Jr. et al. | 210/616 |

FOREIGN PATENT DOCUMENTS 1104795  7/1981  Canada.

OTHER PUBLICATIONS

Weber, et al.,; "Toxic Substance Removal in Activated Sludge and PAC Treatment Systems"; EPA/600/-S2-68/045, Jun. 1986.

Primary Examiner—Tom Wyse
Attorney, Agent, or Firm—Tipton L. Randall

[57] ABSTRACT

Water contaminated with at least one volatile compound is treated by air stripping the volatile compound into the gas phase, then removing the volatile compound from the gas phase by contacting it with an aqueous mixture of biological solids and powdered adsorbent. The partially-purified water is further treated by a biophysical aerobic process which in turn produces the aqueous mixture of biological solids and powdered adsorbent used to remove the volatile compound from the gas phase. The aqueous mixture of biological solids and powdered adsorbent containing the volatile compound is thickened and the solids slurry treated by regeneration, preferrably wet air oxidation, to destroy the biological solids and volatile compound as well as regenerate the powdered adsorbent. The regenrated adsorbent may be returned to the biophysical aerobic treatment process.

31 Claims, 2 Drawing Sheets

PROCESS FOR TREATMENT OF WATER CONTAINING VOLATILE AND TOXIC COMPOUNDS

BACKGROUND OF THE INVENTION

1. Field of the Invention

The present invention is concerned with a process for treating water containing volatile compounds and toxic compounds and with the ultimate disposal or destruction of these compounds.

2. Information Disclosure Statement

Aerobic biological treatment of wastewaters which contain volatile compounds can result in the emission of the volatile compounds into the environment. The volatile compounds are stripped from the aqueous phase during the process of transferring oxygen to the wastewater. Whether the aeration is accomplished by bubble or surface aeration makes little difference in the volatilization affect.

Studies by Weber and Jones, "Toxic Substance Removal in Activated Sludge and PAC Treatment Systems", EPA/600/S2-86/045, June, 1986 demonstrated that addition of powdered activated carbon to an aerobic biological system results in greatly reduced stripping of volatile compounds.

The addition of powdered adsorbent to the activated sludge process aeration basin constitutes the Powdered Activated Carbon Treatment (PACT ™) process, examples of such process are described in U.S. Pat. Nos. 3,904,518 and 4,069,148. The preferred powdered adsorbent is powdered activated carbon and it is generally economical to regenerate the powdered carbon once its adsorptive properties are expended and to reuse the regenerated carbon in the treatment process. An efficient method of carbon regeneration is wet air oxidation of the mixture of biological solids and spent carbon. Wet air oxidation at temperatures of 400° to 550° F. (204° to 288° C.) and pressures of 350 psig to 1900 psig (2413 to 13,100 KPa) destroys the volatile portion of the biological solids and oxidizes the organic substances adsorbed on the surface of the powdered carbon restoring adsorptive capacity. The resulting regenerated carbon is recycled to the treatment process.

An alternative method of carbon regeneration and biological solids disposal is controlled flame incineration operating under limited oxygen conditions. This thermal regeneration is generally carried out under a controlled atmosphere such as in a multiple hearth furnace. The hot thermally regenerated carbon and biomass residue mixture is cooled by introduction into a water quench tank. The resulting aqueous slurry of regenerated carbon is recycled to the treatment process.

Some contaminated wastewaters may contain such high concentrations of volatile compounds that even the PACT ™ treatment system cannot retain all of the volatile compounds in the aqueous phase during aeration.

Air stripping often is used to intentionally remove volatile compounds from water or wastewater. This process is well known in the art and generally involves counter-current contact of water and air in a stripping tower with contaminated water passing down the tower over a packing and air directed up from the bottom to strip out the volatile compounds. A mechanical blower is often employed to introduce air into the bottom of the tower.

This air stripping only results in transfer of the volatile compounds from the aqueous phase to the gaseous phase and does not address final disposal of these volatile compounds. The problem is particularly serious where high concentrations of volatile compounds are present in the water.

In related publications, Copa, et al in U.S. Pat. No. 3,828,525 disclose removing contaminants and objectional odors from wet air oxidation gases by scrubbing with activated sludge or a mixture of activated sludge and fresh sewage.

Burant, et al in Canadian Pat. No. 1,104,795 disclose removing objectionable contaminants from odorous gas streams by scrubbing with an aqueous suspension containing both biological solids and activated carbon.

The present invention provides an effective and useful method of treating water contaminated with volatile compounds or toxic compounds, as well as the ultimate disposal of these substances.

SUMMARY OF THE INVENTION

An object of the invention is to provide a process for treating wastewater contaminated with volatile compound present at a concentration toxic to microorganisms used in the treatment process.

Another object of the invention is to remove a substantial portion of the volatile compound from the wastewater before the wastewater comes in contact with the microorganisms used in the treatment process.

Another object of the invention is to prevent the emission of volatile compound into the atmosphere during the treatment process.

A further object of the invention is to provide for the destruction or disposal of the volatile compound from the contaminated wastewater.

Although the invention is described with reference to wastewater contaminated with one or more volatile compounds, the term wastewater refers to any aqueous liquid, such as industrial process wastewater, municipal wastewater, polluted groundwater or leachate, contaminated with at least one volatile compound.

This is a process for treating wastewater contaminated with at least one volatile compound by a combination of stripping and biophysical treatment. The wastewater is subjected to stripping to remove a substantial portion of the volatile compound. The partially-treated wastewater then passes to a biophysical treatment system wherein further purification occurs. The gas which strips the volatile compound from the wastewater is directed to a contact tank wherein an aqueous mixture of biological solids and powdered adsorbent removes a substantial portion of the volatile compound from the gas phase. The aqueous mixture of biological solids and powdered adsorbent is excess material removed from the biophysical treatment system used to treat the partially-purified wastewater. The volatile compound is predominantly associated with the biological solids and powdered adsorbent after removal from the gas phase. The aqueous mixture of solids and adsorbent with associated volatile compound is then settled to a clarifier liquid phase and a settled solids slurry phase. The liquid phase is returned to the biophysical treatment system while the settled solids slurry phase may be removed to disposal or treated to destroy the biological solids, associated volatile compound, and to renew the surface of the powdered adsorbent. The regenerated adsorbent may be returned to the biophysical treatment system.

In a further embodiment, fresh powdered adsorbent is added to the aqueous mixture of biological solids and powdered adsorbent in the contact tank to increase the capacity of the mixture to remove the volatile compound entering the contact tank. The additional adsorbent is carried along with the aqueous mixture of biological solids and powdered adsorbent to the settling step.

In yet another embodiment of the invention, an aqueous powdered adsorbent slurry alone is employed in the contact tank to remove the volatile compound from the gas phase entering therein. The powdered adsorbent slurry with associated volatile compound is then combined with an aqueous mixture of biological solids and powdered adsorbent from the biophysical treatment system for disposal or treatment to destroy biological solids and the volatile compound associated with the powdered adsorbent slurry, and to renew the surface of the powdered adsorbent. The regenerated adsorbent may be returned to the biophysical treatment system.

DESCRIPTION OF THE PREFERRED EMBODIMENT

Figure 1:
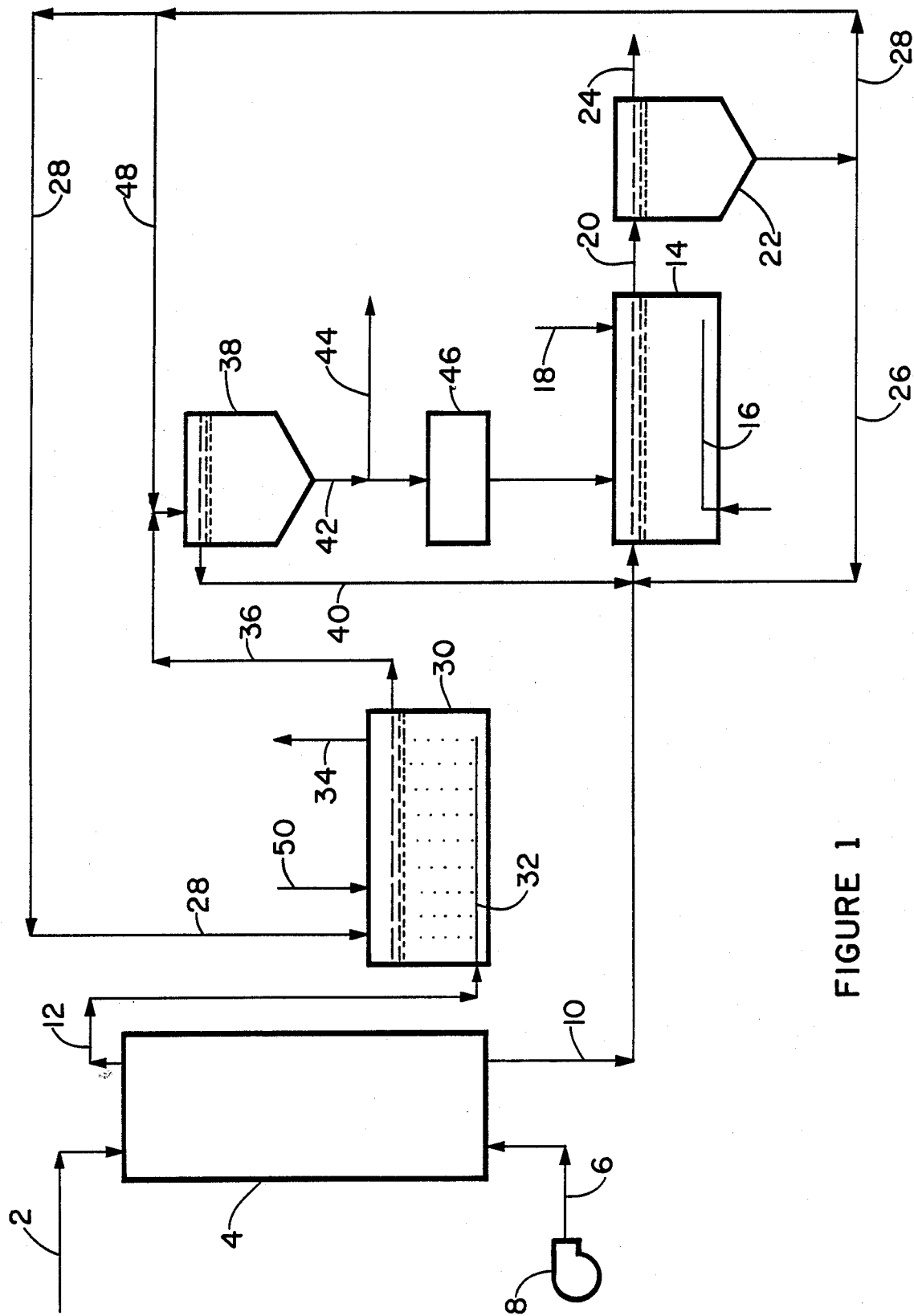
FIG. 1 is a flow diagram of one embodiment of the invention using biological solids and powdered adsorbent slurry to remove volatile compound from air stripper exhaust.

Referring to FIG. 1, wastewater contaminated with at least one volatile compound is introduced through a conduit 2 into the top of a stripping tower 4. A stripping gas, preferrably air, is introduced into the bottom of the stripping tower 4 through a conduit 6 by a blower 8. Alternatively air may be supplied to the tower 4 by natural convection means through conduit 6. The stripping tower 4 contains a packing material to provide a large contact surface between contaminated wastewater passing down the tower and air passing up the tower. A substantial portion of the volatile compound is transferred from the liquid phase to the gas phase within the tower 4. Partially-purified wastewater leaves the bottom of the tower 4 by a conduit 10 while air, containing the volatile compound, leaves the top of the tower by a conduit 12.

The volatile compounds amenable to removal from wastewater by air stripping are generally low molecular weight compounds, often containing halogen atoms. These compounds include halogenated aliphatic compounds containing from one to about six carbon atoms.

Examples of these halogenated aliphatic compounds include halogenated methanes ($C_1$) such as $CH_2Cl_2$, $CHCl_3$, $CCl_4$, Freon TM 11 ($CCl_3F$) and Freon TM 12 ($CCl_2F_2$); halogenated ethanes and ethylenes ($C_2$) such as $ClCH_2CH_2Cl$, $CH_3CHCl_2$, $CH_3CCl_3$, vinyl chloride, vinylidine chloride, trichloroethylene and perchloroethylene, Freon TM 114 ($ClCF_2CF_2Cl$); halogenated propanes and propylenes ($C_3$) such as $ClCH_2CHCl$—$CH_2Cl$, $ClCH_2CHClCH_2Br$; etc. Also included as compounds removable by stripping are halogenated aromatic compounds such as chlorobenzene, bromobenzene, dichlorobenzenes (3 isomers) and trichlorobenzenes.

Examples of hydrocarbon compounds include aromatic compounds such as benzene, toluene, xylenes (3 isomers), ethylbenzene and styrene. Also included are complex hydrocarbon mixtures such as gasoline, naphtha, kerosene, mineral spirits, diesel fuel or fuel oil. Further, mixtures of individual volatile compounds are often found in contaminated wastewater, depending on the source of the particular wastewater.

The concentration of individual volatile compounds in wastewater to which this invention applies may be as low as one or two parts per million (mg/l) and as high as the solubility of the particular compound in wastewater. This concentration may be as high as 5,000 to 10,000 parts per million (mg/l) for certain compounds. Most wastewaters also contain substances which cannot be removed by gas stripping, therefore, additional treatment is required to produce an environmentally acceptable effluent.

Partially-treated wastewater flows by the conduit 10 to further treatment in an aerobic biophysical treatment system to remove additional nonvolatile pollutants. The wastewater flows into an aeration basin 14 where it comes into contact with a mixture of biological solids and powdered adsorbent. This mixture is also termed mixed liquor solids. The preferred adsorbent is powdered activated carbon.

Aeration and mixing of solids and liquid within the aeration basin 14 is by aeration means 16. Mixing in the aeration basin 14 may be assisted by mechanical means (not shown) as well. Fresh powdered adsorbent is added to the aeration basin 14 by a conduit 18 to maintain the desired concentration of adsorbent in the mixed liquor of the aeration basin. After a specified residence time in the aeration basin 14, the wastewater and mixed liquor solids flow by a conduit 20 to a clarifier 22 where the solids settle to the bottom and clarified wastewater, now purified, overflows to a conduit 24 for discharge. The settled mixed liquor solids from the clarifier 22 are recycled by a conduit 26 to the aeration basin 14 to maintain the desired concentration of biological solids and powdered adsorbent within the basin 14.

The aerobic biophysical treatment process of FIG. 1 is operated as a continuous flow process. This biophysical process may alternatively be operated in a batch mode. In this variation clarifier 22 and recycle conduit 26 are eliminated and filling, aeration, settling and drawing off of treated effluent all occur within the aeration basin 14. A portion of mixed liquor solids slurry is wasted from the aeration basin 14 to control solids concentration therein, as described below for the continuous flow process.

During normal operation of the biophysical treatment system a portion of the mixed liquor solids slurry removed from the clarifier 22 is wasted or sent to disposal to control the amount of solids in the treatment system. In the present invention the wasted mixed liquor solids slurry is directed by a conduit 28 to a contact tank 30. The air which contains the volatile compound from the stripper 4 enters the tank 30 by a conduit 12 and is dispersed through sparge 32 to contact the mixed liquor solids slurry within the contact tank 30. The biological solids of the contact tank slurry are at a concentration between about 50 mg/l and 20,000 mg/l and powdered adsorbent at a concentration between about 50 mg/l and 30,000 mg/l. The preferred range of concentration of biological solids in the contact tank 30 is between 1,000 and 5,000 mg/l. The preferred range of powdered adsorbent concentration therein is between 5,000 and 20,000 mg/l.

The volatile compound is substantially adsorbed by the mixed liquor slurry solids and the purified air leaves the tank 30 by an exit 34. The volatile compound containing mixed liquor solids slurry exits the tank 30 by a conduit 36 and flows to a thickener 38. Within the thickener 38 the mixed liquor slurry is settled further to form an upper clarified liquid phase, which is returned to the head of the aerobic biophysical treatment system by a conduit 40, and a thickened solids slurry, with associated volatile compound therein. For small volume systems, the thickened solids slurry is drawn off from the bottom of the thickener 38 by a conduit 42 and sent to disposal by a conduit 44.

Alternatively, for larger volume systems, the thickened solids slurry phase from the thickener 38 is taken by the conduit 42 to a regeneration means 46 where biological solids, the associated volatile compound, and other organic material on the powdered adsorbent are destroyed and the adsorptive properties of the adsrobent are renewed. Regeneration means is preferably a wet air oxidation unit where regeneration of the powdered adsorbent occurs at conditions of 204°–288° C. (400°–550° F.) and 350–1900 psig (2413–13,100 KPa). The resulting regenerated powdered adsorbent slurry is returned to the aeration basin 14 to supplement the powdered adsorbent therein.

Another regeneration means is a regeneration furnace. In this alternative the regeneration of the powdered adsorbent is by thermal means, a controlled atmosphere furnace. This alternative requires further dewatering (not shown) of the thickened solids slurry from the thickener 38 prior to introduction of the solids and associated volatile compound into the furnace. The biological solids and volatile compound are destroyed in the furnace and the regenerated powdered adsorbent is cooled in a water quench bath with the resulting adsorbent slurry recycled to the aeration basin 14.

In the event that more wasted mixed liquor slurry is produced than is required by the contact tank 30, the excess wasted slurry may be diverted to the thickener 38 by a conduit 48. The excess wasted slurry is thickened and processed along with that material removed from the contact tank 30.

In a further embodiment of the invention, fresh powdered adsorbent is added to the aqueous mixture of biological solids and powdered adsorbent in the contact tank 30 by a conduit 50. The additional powdered adsorbent increases the capacity of the aqueous mixture to remove the volatile compound entering the contact tank 30 from the air exiting from the stripper 4. The additional powdered adsorbent is incorporated with the aqueous mixture therein and the volatile compound containing mixture of adsorbent and biological solids exits the tank 30 by the conduit 36 and flows to the thickener 38 as previously described.

Figure 2:
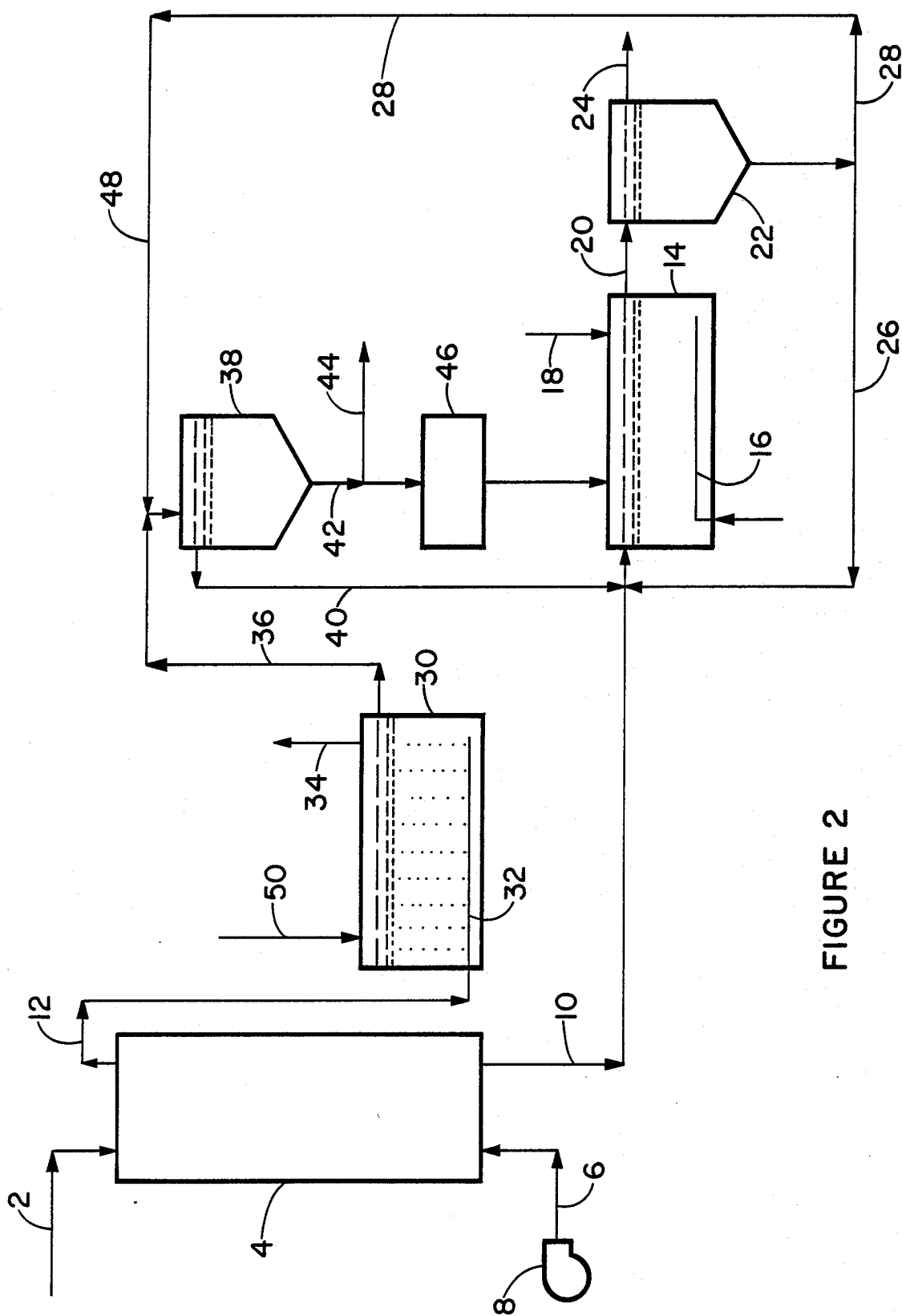
FIG. 2 is a flow diagram of another embodiment of the invention using powdered adsorbent slurry to remove volatile compound from air stripper exhaust.

FIG. 2 is an alternative embodiment of the instant invention with identical elements represented by the same indicia as previously described in FIG. 1. Wastewater contaminated with at least one volatile compound is introduced through a conduit 2 into the top of a stripping tower 4. A stripping gas, preferably air, moves upward through the tower 4 and a substantial portion of volatile compound is transferred from the liquid phase to the gas phase within the tower 4. Partially-purified wastewater leaves the bottom of the tower 4 by a conduit 10 while air containing the volatile compound leaves the top of the tower by a conduit 12. Partially-treated wastewater flows by conduit 10 to further treatment in an aerobic biophysical treatment system to remove additional nonvolatile pollutants as described for FIG. 1. In this embodiment of the invention, the settled mixed liquor solids from the bottom of clarifier 22 which are removed from the biophysical treatment system flow solely to settler 38 via conduits 28 and 48.

Volatile compound contaminated air enters the contact tank 30 by the conduit 12 and through the sparge 32. In this embodiment the contact tank 30 contains an aqueous slurry of fresh powdered adsorbent alone. The slurry removes the volatile compound from the air which then exits the tank by an exit 34. The powdered adsorbent in the aqueous slurry within the tank 30 is present at a concentration between about 50 mg/l and 50,000 mg/l. The preferred range of powdered adsorbent concentration therein is between about 5,000 and 20,000 mg/l. The volatile compound containing powdered adsorbent slurry flows from the contact tank 30 by a conduit 36 to a settler 38. The level of aqueous powdered adsorbent slurry within the tank 30 is maintained by adding fresh aqueous powdered adsorbent slurry from conduit 50. The volatile compound containing powdered adsorbent slurry is combined with excess mixed liquor solids from the biophysical treatment system which flow to settler 38 by conduits 28 and 48. The powdered adsorbent slurry and mixed liquor solids slurry are settled to form an upper, clarified liquid phase, which is returned to the head of the aerobic biophysical treatment system by a conduit 40, and a thickened solids slurry, with associated volatile compound therein. The options of disposal or regeneration of the thickened solids slurry are the same as described in FIG. 1.

It is pointed out that while the specific embodiments are illustrative of the practice of the invention, other expedients known to those skilled in the art may be employed to carry out Applicant's essential inventive concept without departing from the spirit of the invention or the scope of the claims.

I claim:

1. A process for treating wastewater contaminated with at least one volatile compound comprising the steps;
   (a) stripping said volatile compound from said wastewater by gas stripping means to produce a gas phase containing said volatile compound and a partially-treated wastewater containing a substantially lower concentration of said volatile compound;
   (b) contacting said volatile compound containing gas phase with an aqueous mixture of biological solids and powdered adsorbent, in a contacting means, to transfer a substantial portion of said volatile compound from said gas phase to said aqueous mixture of biological solids and powdered adsorbent, to form a purified gas phase which is released from said contacting means and a volatile compound contaminated aqueous mixture of biological solids and powdered adsorbent; and
   (c) treating said partially-treated wastewater from step a) by a biophysical aerobic treatment process which produces said aqueous mixture of biological solids and powdered adsorbent used in step (b), to produce a treated wastewater which is discharged from said treatment process.

2. A process according to claim 1 wherein a predetermined amount of fresh powdered adsorbent is added to said mixture of biological solids and powdered adsorbent used in said contacting means of step (b) to assist in transferring said volatile compound from said gas phase to said aqueous mixture.

3. A process according to claim 1 further comprising the steps;
   (d) settling said contaminated aqueous mixture formed in step (b) by settling means to produce an upper clarified aqueous phase and a lower contaminated thickened solids slurry phase;
   (e) separating said clarified aqueous phase from said contaminated thickened solids slurry phase; and
   (f) treating said separated clarified aqueous phase by said biophysical aerobic process of step (c) to produce a treated wastewater which is discharged from said treatment process.

4. A process according to claim 3 further comprising the step;
   (g) regenerating said separated contaminated thickened solids slurry phase of step (e) to destroy biological solids and volatile compound and produce a regenerated powdered adsorbent.

5. A process according to claim 4 wherein said adsorbent is powdered activated carbon.

6. A process according to claim 4 wherein said regenerating step (g) is by wet air oxidation.

7. A process according to claim 4 wherein said regenerating step (g) is by thermal means.

8. A process according to claim 4 further comprising the step;
   (h) adding said regenerated powdered adsorbent produced in step (g) to said biophysical aerobic treatment process of step (c).

9. A process according to claim 3 wherein additional aqueous biological solids and powdered adsorbent mixture from said treatment process of step (c) is added to said contaminated aqueous mixture of biological solids and powdered adsorbent in settling step (d).

10. A process according to claim 3 further comprising the step of treating said contaminated thickened solids slurry phase produced in step (d) by dewatering and disposal.

11. A process according to claim 1 wherein said aqueous mixture within said contacting means in step (b) contains a biological solids concentration of about 50 mg/l to about 20,000 mg/l and a powdered adsorbent concentration of about 50 mg/l to about 30,000 mg/l.

12. A process according to claim 11 wherein said aqueous mixture within said contacting means in step (b) preferably contains a biological solids concentration of about 1,000 mg/l to about 5,000 mg/l and a powdered adsorbent concentration of about 5,000 mg/l to about 20,000 mg/l.

13. A process for treating wastewater contaminated with at least one volatile compound and additional nonvolatile pollutants comprising the steps;
   (a) stripping said volatile compound from said wastewater by gas stripping means to produce a gas phase containing said volatile compound and a partially-treated wastewater containing a substantially lower concentration of said volatile compound;
   (b) contacting said volatile compound containing gas phase with an aqueous mixture of biological solids and powdered activated carbon, in a contacting means, to transfer a substantial portion of said volatile compound from said gas phase to said aqueous mixture of biological solids and powdered activated carbon, to form a purified gas phase which is released from said contacting means and a volatile compound contaminated aqueous mixture of biological solids and powdered activated carbon,
   (c) treating said partially-treated wastewater from step (a) by a biophysical aerobic treatment process which produces said aqueous mixture of biological solids and powdered activated carbon used in step b), to produce a treated wastewater which is discharged from said treatment process;
   (d) settling said contaminated aqueous mixture formed in step b) by settling means to produce an upper clarified aqueous phase and a lower contaminated thickened solids slurry phase;
   (e) separating said clarified aqueous phase from said contaminated thickened solids slurry phase; and
   (f) treating said separated clarified aqueous phase by said biophysical aerobic process of step c) to produce a treated wastewater which is discharged from said treatment process.

14. A process according to claim 13 wherein a predetermined amount of fresh powdered activated carbon is added to said mixture of biological solids and powdered activated carbon used in said contacting means of step b) to assist in transferring said volatile compound from said gas phase to said aqueous mixture.

15. A process according to claim 13 further comprising the step;
   (g) regenerating said separated contaminated thickened solids slurry phase of step e) to destroy biological solids and volatile compound and produce a regenerated powdered activated carbon.

16. A process according to claim 15 wherein said regenerating step (g) is by wet air oxidation.

17. A process according to claim 15 wheren said regenerating step (g) is by thermal means.

18. A process according to claim 15 further comprising the step;
   (h) adding said regenerated powdered activated carbon produced in step (g) to said biophysical aerobic treatment process of step (c).

19. A process according to claim 13 wherein additional aqueous biological solids and powdered activated carbon mixture from said treatment process of step (c) is added to said contaminated aqueous mixture of biological solids and powdered activated carbon in settling step (d).

20. A process according to claim 13 further comprising the step of treating said contaminated thickened solids slurry phase produced in step (d) by dewatering and disposal.

21. A process according to claim 13 wherein said aqueous mixture within said contacting means in step (b) contains a biological solids concentration of about 50 mg/l to about 20,000 mg/l and a powdered activated carbon concentration of about 50 mg/l to about 30,000 mg/l.

22. A process according to claim 21 wherein said aqueous mixture within said contacting means in step (b) preferably contains a biological solids concentration of about 1,000 mg/l to about 5,000 mg/l and a powdered activated carbon concentration of about 5,000 mg/l to about 20,000 mg/l.

23. A process for treating wastewater contaminated with at least one volatile compound comprising the steps;
   (a) stripping said volatile compound from said wastewater by gas stripping means to produce a gas phase containing said volatile compound and a partially-treated wastewater containing a substantially lower concentration of said volatile compound;

(b) contacting said volatile compound containing gas phase with an aqueous slurry of powdered adsorbent, in a contacting means, to transfer a substantial portion of said volatile compound from said gas phase to said aqueous slurry of powdered adsorbent, to form a purified gas phase which is released from said contacting means and a volatile compound contaminated aqueous slurry of powdered adsorbent;

(c) treating said partially-treated wastewater from step (a) by a biophysical aerobic treatment process which employs a mixture of powdered adsorbent and biological solids, to produce a treated wastewater which is discharged from said treatment process;

(d) combining and settling said contaminated aqueous slurry of powdered adsorbent formed in step (b) with a slurry of powdered adsorbent and biological solids wasted from said aerobic biophysical process of step (c), in a settling means, to produce an upper clarified aqueous phase and a lower contaminated thickened solids slurry phase;

(e) separating said clarified aqueous phase from said contaminated thickened solids slurry phase; and (f) treating said separated clarified aqueous phase by said biophysical aerobic process of step (c) to produce a treated wastewater which is discharged from said treatment process.

24. A process according to claim 23 further comprising the step;

(g) regenerating said separated contaminated thickened solids slurry phase of step (e) to destroy biological solids and volatile compound and produce a regenerated powdered adsorbent.

25. A process according to claim 24 wherein said adsorbent is powdered activated carbon.

26. A process according to claim 24 wherein said regenerating step (g) is by wet air oxidation.

27. A process according to claim 24 wheren said regenerating step (g) is by thermal means.

28. A process according to claim 24 further comprising the step;

(h) adding said regenerated powdered adsorbent produced in step (g) to said biophysical aerobic treatment process of step (c).

29. A process according to claim 23 further comprising the step of treating said contaminated thickened solids slurry phase produced in step (d) by dewatering and disposal.

30. A process according to claim 23 wherein said aqueous slurry of powdered adsorbent within said contacting means in step (b) contains a powdered adsorbent concentration of about 50 mg/l to about 50,000 mg/l.

31. A process according to claim 30 wherein said aqueous slurry of powdered adsorbent within said contacting means in step (b) preferably contains a powdered adsorbent concentration of about 5,000 mg/l to about 20,000 mg/l.

* * * * *